(12) United States Patent
Vobecky et al.

(10) Patent No.: US 12,513,975 B2
(45) Date of Patent: Dec. 30, 2025

(54) MODULE COMPRISING A SWITCHABLE BYPASS DEVICE

(71) Applicant: Hitachi Energy Ltd, Zurich (CH)

(72) Inventors: Jan Vobecky, Prague (CZ); Ying-Jiang Hafner, Ludvika (SE)

(73) Assignee: HITACHI ENERGY LTD, Zurich (CH)

(*) Notice: Subject to any disclaimer, the term of this patent is extended or adjusted under 35 U.S.C. 154(b) by 415 days.

(21) Appl. No.: 18/038,160

(22) PCT Filed: Nov. 19, 2021

(86) PCT No.: PCT/EP2021/082298
§ 371 (c)(1),
(2) Date: May 22, 2023

(87) PCT Pub. No.: WO2022/112127
PCT Pub. Date: Jun. 2, 2022

(65) Prior Publication Data
US 2023/0411503 A1    Dec. 21, 2023

(30) Foreign Application Priority Data
Nov. 25, 2020   (EP) .................... 20209823

(51) Int. Cl.
*H10D 84/00*   (2025.01)
*H02M 1/32*    (2007.01)
(Continued)

(52) U.S. Cl.
CPC .......... *H10D 84/131* (2025.01); *H02M 1/325* (2021.05); *H02M 7/4835* (2021.05); *H10D 62/142* (2025.01); *H10D 62/148* (2025.01)

(58) Field of Classification Search
CPC ............... H10D 84/131; H10D 62/142; H10D 62/148; H02M 1/325; H02M 7/4835
(Continued)

(56) References Cited

U.S. PATENT DOCUMENTS

2011/0235221 A1* 9/2011 Vogeli .................... H02M 1/32
                                                                        361/18
2019/0131885 A1* 5/2019 Dorn ....................... H02M 1/32

FOREIGN PATENT DOCUMENTS

CN    102522882 B    6/2012
CN    202374174 U    8/2012
(Continued)

OTHER PUBLICATIONS

Vobecky et al., "Bidirectional Phase Control Thyristor (BiPCT): A New Antiparallel Thyristor Concept", ABB Power Grids Switzerland Ltd., 2020 32nd International Symposium on Power Semiconductor Devices and ICs (ISPSD), Sep. 2020, DOI: 10.1109/ISPSD46842.2020.9170072, 4 pages.
(Continued)

*Primary Examiner* — Yemane Mehari
(74) *Attorney, Agent, or Firm* — Procopio, Cory, Hargreaves & Savitch LLP

(57) ABSTRACT

A module (100) is specified, the module (100) comprising a first module connection (108), a second module connection (109), an energy store (105), a first electrical switch (101) and a second electrical switch (102), wherein a switchable bypass device (1) is arranged between the first module connection (108) and the second module connection (109) and wherein the switchable bypass device (1) is configured to remain in a bidirectional current conducting state in response to a single trigger pulse.

13 Claims, 5 Drawing Sheets

(51) Int. Cl.
*H02M 7/483* (2007.01)
*H10D 62/13* (2025.01)

(58) Field of Classification Search
USPC .......................................................... 363/58
See application file for complete search history.

(56) References Cited

FOREIGN PATENT DOCUMENTS

| | | | |
|---|---|---|---|
| CN | 107026577 | A | 8/2017 |
| CN | 108270349 | B | 7/2018 |
| CN | 109599883 | A | 4/2019 |
| CN | 110677029 | A | 10/2019 |
| CN | 110556373 | A | 12/2019 |
| CN | 110829811 | A | 2/2020 |
| CN | 111742411 | A | 10/2020 |
| DE | 202017103499 | U1 | 10/2017 |
| JP | 05102463 | A | 4/1993 |
| JP | 2003282865 | A | 10/2003 |
| WO | 2011107363 | A1 | 9/2011 |
| WO | WO-2019011717 | A1 * | 9/2011 ............. H01L 23/30 |
| WO | WO-2019158594 | A1 * | 8/2019 ........... H10D 64/291 |

OTHER PUBLICATIONS

Vobecky et al., "The Bidirectional Phase Control Thyristor", IEEE Transactions on Electron Devices, vol. 67, No. 7, Jul. 2020, pp. 2844-2849.

Thomas et al., "The Bidirectional Control Thyristor (BCT)", ABB Semiconductors AG Switzerland, Power Conversion, Intelligent Motion & HFPC Conference (Power Convers Intell Motion HFPC Conf), 1998, 10 pages.

Zhao et al., "Design of New Intelligent Commutation Switch Based on Bidirectional Thyristor", Shandong University School of Electrical Engineering, 2019 IEEE 3rd International Electrical and Energy Conference (CIEEC), pp. 241-245.

\* cited by examiner

MODULE COMPRISING A SWITCHABLE BYPASS DEVICE

CROSS-REFERENCE TO RELATED APPLICATIONS

This application is US National Stage of International Patent Application PCT/EP2021/082298, filed Nov. 19, 2021, which claims priority to European Patent Application No. 20209823.2, filed on Nov. 25, 2020, both of the contents of which are incorporated herein by reference.

A module comprising a switchable bypass device is specified.

Modular multilevel converters (MMCs) are widely used in high-voltage direct-current transmission (HVDC) and Static Synchronous Compensator (STATCOM) applications.

Typical submodules of such MMC converters comprise a cell capacitor in a half-bridge or full-bridge cell, wherein a large number of such submodules are electrically connected in series. The voltage of the capacitor is connected to the output of a cell by active switches. These switches are typically Insulated Gate Bipolar Transistors (IGBTs) with antiparallel connected fast recovery diodes. As the diode cannot withstand high surge-current, a bypass device is being used to protect the diode. A similar situation appears, if the switching devices are Metal Oxide Semiconductor Field Effect Transistors (MOSFETs) with antiparallel connected fast diodes.

If an element of these submodules fails, for instance due to a failure of switching devices or communication errors, an uncontrolled state of the charge of the cell energy store may occur which is a potential risk to the submodule or the entire MMC converter.

Document WO 2011/107363 A1 describes a mechanical bypass in order to ensure that an MMC keeps working if one or more modules connected in series fail.

However, due to the inertia of its mechanical components, the mechanical bypass switch requires a certain period of time until it assumes a conductive state and safely takes over the current in the event of a fault. During this period, the current may continue to flow into the module and keep charging the electrical energy store thereby damaging the energy store. On the other hand, when the energy store is subsequently discharged via the mechanical bypass switch, the enlarged stored amount of energy can be explosively converted into heat. In addition, due to the sudden reversal of the current direction in the components of the module, further destruction or damage to the module can occur.

Document CN 110829811 proposes to use a mechanical bypass switch in parallel with two antiparallel thyristors. If, however, an AC current, for example with a frequency of 50 Hz to some hundred Hz is to be bypassed via the antiparallel thyristors, the first one of the thyristors has to turn off before the antiparallel one can turn on. This requires a complex triggering process resulting in a reduced reliability of the bypass.

It is therefore an object of the invention to specify a module that provides reliable protection in the event of a failure.

This object is obtained, inter alia, by a module according to claim 1. Developments and expediencies are subject of the further claims.

According to at least one embodiment, a module comprises a first module connection, a second module connection. The module further comprises an energy store and a first electrical switch and a second electrical switch, wherein a switchable bypass device is arranged between the first module connection and the second module connection. The switchable bypass device is configured to remain in a bidirectional current conducting state in response to a single trigger pulse.

In the event of a failure, the switchable bypass device may be brought in a conducting state thereby providing an electrical bypass from the first module connection to the second module connection. For instance, the switchable bypass device is configured to be electrically or optically triggered.

For example, at least alternating currents with a frequency of at least 50 Hz may be bidirectionally conducted through the switchable bypass device in response to a single trigger pulse. In other words, once the switchable bypass device is in the current conducting state (or ON state), it remains in the conducting state even if the polarity of the voltage between the first main electrode and the second main electrode changes. Consequently, it is not necessary to trigger the switchable bypass device each time the polarity of the applied voltage changes. For example, the switchable bypass device is a single power semiconductor device.

According to at least one embodiment the switchable bypass device comprises a semiconductor body extending between a first main surface and a second main surface, a first main electrode arranged on the first main surface, and a second main electrode arranged on the second main surface. Exemplarily, the first main surface and second main surface are arranged on opposite sides of the switchable bypass device. The semiconductor body comprises a first base layer of a first conductivity type, a second base layer of the first conductivity type, and a third base layer of a second conductivity type different than the first conductivity type arranged between the first base layer and the second base layer. The first main electrode acts as a cathode for a first thyristor functional element and as an anode for a second thyristor functional element of the switchable bypass device.

With respect to the blocking direction the first thyristor functional element and the second thyristor functional element are arranged in anti-parallel, for instance.

For example, the first conductivity type is p-type and the second conductivity type is n-type or vice versa.

According to at least one embodiment of the module, the first main electrode adjoins at least one first emitter region of the second conductivity type and at least one first emitter short region of the first conductivity type. For example, the first main electrode acts as the cathode for the first thyristor functional element via the first emitter region and as the anode for the second thyristor functional element via the first emitter short region. In other words, cathode short regions of one thyristor functional element act as anode regions of the antiparallel thyristor functional element at the same time.

According to at least one embodiment of the module, each of the first thyristor functional element and the second thyristor functional element uses an entire area of a p-n junction formed between the first base layer and the third base layer. For example, each of the first thyristor functional element and the second thyristor functional element uses an entire area a p-n junction formed between the second base layer and the third base layer. If, for example, the first conductivity type is p-type and the second conductivity type is n-type, the first thyristor functional element and the second thyristor functional element may use a common p-n-p base layer sequence. A separation region between two antiparallel thyristors may be dispensed with. The first, second and third base layer may be completely unstructured in lateral direction, i.e. in a direction extending in parallel to the first main surface. Furthermore, it is not necessary to provide two separate electrodes on the same side of the switchable bypass device wherein one of them acts as an anode for one thyristor and the other one acts as cathode for the other thyristor.

A very high surge current capability close to that of a single thyristor of the same size may be obtained for the switchable bypass device.

According to at least one embodiment of the module, the semiconductor body is configured with respect to a charge carrier recombination lifetime such that the switchable bypass device does not turn off in response to a voltage commutation. Thus, a change in the polarity of the voltage between the first main electrode and the second main electrode does not cause the switchable bypass device to switch into a non-conducting state. For example, a turn-off occurs if the switchable bypass device is brought below its holding current.

In conventional applications of bidirectional thyristor devices, the lifetime of excess carriers in the n-type and p-type base layers is intentionally reduced by electron irradiation or ion implantation near the p-n junctions in order to ensure that the thyristor is capable of turning off in response to a voltage commutation. This way of local lifetime control by proton irradiation is described in document WO 2019/158594 A1, for instance.

In the present bypass device, in contrast, the lifetime of excess charge carriers may be intentionally kept so large that an electron-hole plasma created in the ON state recombines very slowly during commutation. The high lifetime may be obtained by leaving the semiconductor body unirradiated during manufacture, i.e. there is no proton or electron irradiation of the semiconductor body. If the concentration of the electron-hole plasma is sufficiently high during crossing the zero-current level, the formation of a space charge region (SCR) is prevented. Thus, the switchable bypass device remains in the ON state if the polarity of the voltage between the first and second main electrode changes. There is no commutation turn-off. A turn-off may only occur, if the switchable bypass device is brought below its holding current. Thus, a single trigger pulse for switching into the ON state for one of the polarities, for example via a gate electrode or optically, is sufficient for maintaining the ON state for both current directions. Thus, the switchable bypass device may represent an AC switch.

According to at least one embodiment of the module, the module is configured as a half-bridge arrangement. A half-bridge arrangement may provide two different voltage levels between the first and second module connections. In a half-bridge arrangement, the number of required components such as switches is minimized.

According to at least one embodiment of the module, the module is configured as a full-bridge arrangement. A full-bridge arrangement may provide three different voltage levels between the first and second module connections. For example, the full-bridge arrangement comprises four switches.

According to at least one embodiment of the module, the module is configured for a modular multi-level converter. For example, the module represents one of the cells of the modular multi-level converter. For example, the cells are electrically connected in series. Using the switchable bypass device high fault currents, for example above 1 kA or above kA can be handled reliably in case of a failure within the modular multi-level converter. While a fault occurs, the active switches like Insulated Gate Bipolar Transistors of the module may be switched OFF and the modular multi-level converter may be blocked within a few microseconds. Since the free-wheeling diode connected in anti-parallel to the IGBT cannot withstand high surge-current, triggering the switchable bypass device protects the diode.

However, the switchable bypass device is also suited for other applications, for example power applications that require a switchable protection device which is capable of handling high currents, for instance of 100 A ore more.

According to at least one embodiment of the module, the module comprises a further bypass device connected in parallel to the switchable bypass device.

The further bypass device is a mechanical switch, for instance. The further bypass device may be used to release the switchable bypass device from too heavy loading, for example due to a too long fault event. For example, the switchable bypass device switches in the ON state faster than the further bypass device. Once the further bypass device is also in the ON state, at least a part of the current to be bypassed may be conducted via the further bypass device.

According to at least one embodiment of the module, the switchable bypass device is configured to be triggered in the event of a fault within the module or of an external fault causing a voltage applied to the module that exceeds a predetermined value. Thus, the module may be protected against damages caused by both internal and external faults.

According to at least one embodiment of the module, the second main electrode adjoins at least one second emitter region of the second conductivity type and at least one second emitter short region of the first conductivity type.

According to at least one embodiment of the module, an arrangement of first emitter regions and first emitter short regions on the first main surface differs from an arrangement of second emitter regions and second emitter short regions on the second main surface. For example, at least one of a position and a lateral extent of the regions differs. In other words, the switchable bypass device is asymmetric with respect to the arrangement of emitter regions and emitter short regions on the first and second main surface. By means of different arrangements, the switchable bypass device may be configured such that the properties of the switchable bypass device differ with respect to the voltage polarity.

For example, for one polarity of the anode to cathode voltage the surge current capability of the switchable bypass device is lowered so that the device fails to act as protective short circuit. For the opposite polarity of the voltage, the device would continue in bypassing the current fault and limit a potential overvoltage (crowbar operation).

According to at least one embodiment of the module, at least one first emitter region overlaps with a second emitter short region when seen onto the first main surface. Using this arrangement, the length of the current paths in the semiconductor body between the first and second main electrodes may be reduced to minimize the ON state voltage drop of the switchable bypass device.

According to at least one embodiment of the module, the switchable bypass device comprises at most one gate electrode. For example, a first gate electrode is formed on the first main surface. Using the gate electrode the switchable bypass device may be brought into the ON state. The second main surface may be free from a gate electrode. The switchable bypass device may also be configured to be triggered optically. In this case, a gate electrode is replaced by a light sensitive trigger region that may be optically triggered via an optical cable (light guide).

According to at least one embodiment of the module, the switchable bypass device comprises a first gate electrode on the first main surface, and wherein the first main electrode comprises a plurality of first segments that are spaced apart from one another, wherein at least some of the first segments are completely surrounded by the first gate electrode in a view onto the first main surface. The first gate electrode surrounding segments of the first main electrode allows to obtain a switchable bypass device that turns on very fast. For example, the first gate electrode may be distributed over the whole first main surface. Thus, the length of the gate-cathode boundary may increase, resulting in an enhanced di/dt capability for fast turn-on. At the same time the dV/dt capability may remain unchanged.

For example, each of the first segments of the first main electrode adjoins at least one first emitter region of the second conductivity type and at least one first emitter short region of the first conductivity type.

According to at least one embodiment of the module, the switchable bypass device comprises a second gate electrode on the second main surface. In this case the switchable bypass device may be electrically triggered in both current directions via the first and second gate electrode.

According to at least one embodiment of the module, the second main electrode comprises a plurality of second segments that are spaced apart from one another, wherein at least some of the second segments are completely surrounded by the second gate electrode in a view onto the second main surface. The second gate electrode surrounding segments of the first main electrode allows to obtain a switchable bypass device that turns on very fast in both current directions. For example, the second gate electrode may be distributed over the whole second main surface.

According to at least one embodiment of the switchable bypass device the first gate electrode forms an ohmic contact with the first base layer. This means, for instance, that there is no p-n junction between the first gate electrode and the first base layer. Accordingly, the second gate electrode may form an ohmic contact with the second base layer.

For example, the switchable bypass device may provide two antiparallel connected thyristor structures (the first thyristor functional element and the second thyristor functional element) within the same device with an interdigitation of anode and cathode region to avoid the necessity of separation regions between the two antiparallel thyristors. In addition, an interdigitation of gate regions may be provided on at least one of the first and second main surfaces.

According to at least one embodiment of the switchable bypass device the first gate electrode comprises a first grid structure with a plurality of first cells. The first cells may have a polygonal shape in a view onto the first main surface. For instance the first cells may have the shape of a hexagon, an octagon or a tetragon. For instance the switchable bypass device comprises between 20 and 2000 first cells inclusive. The number of cells may be varied in wide ranges depending on the specific requirements on the switchable bypass device.

According to at least one embodiment of the switchable bypass device the first grid structure forms a honeycomb pattern at least in regions. For instance the honeycomb pattern is formed by regular hexagons.

According to at least one embodiment of the switchable bypass device a plurality of first emitter short regions is arranged within one of the first cells. For example the number of first emitter short regions within one of the first cells amounts to between 2 and 100 inclusive. However, only one first emitter short region may also be sufficient.

According to at least one embodiment of the switchable bypass device, an amplifying gate structure is integrated into at least one of the first gate electrode and the second gate electrode. The amplifying gate structure helps to obtain short turn-on times by a fast lateral distribution of the trigger current over a large wafer area. By using an amplifying gate structure both for the first gate electrode and the second gate electrode short turn-on times may be obtained in both current directions.

According to at least one embodiment of the switchable bypass device the first gate electrode and the second gate electrode have the same base shape. In other words the second gate electrode represents a copy or at least a similar copy of the first gate electrode.

A symmetric behaviour of the switchable bypass device with respect to both current directions is facilitated in this manner.

In the exemplary embodiments and figures similar or similarly acting constituent parts are provided with the same reference signs. Generally, only the differences with respect to the individual embodiments are described. Unless specified otherwise, the description of a part or aspect in one embodiment applies to a corresponding part or aspect in another embodiment as well.

Figure 4A:
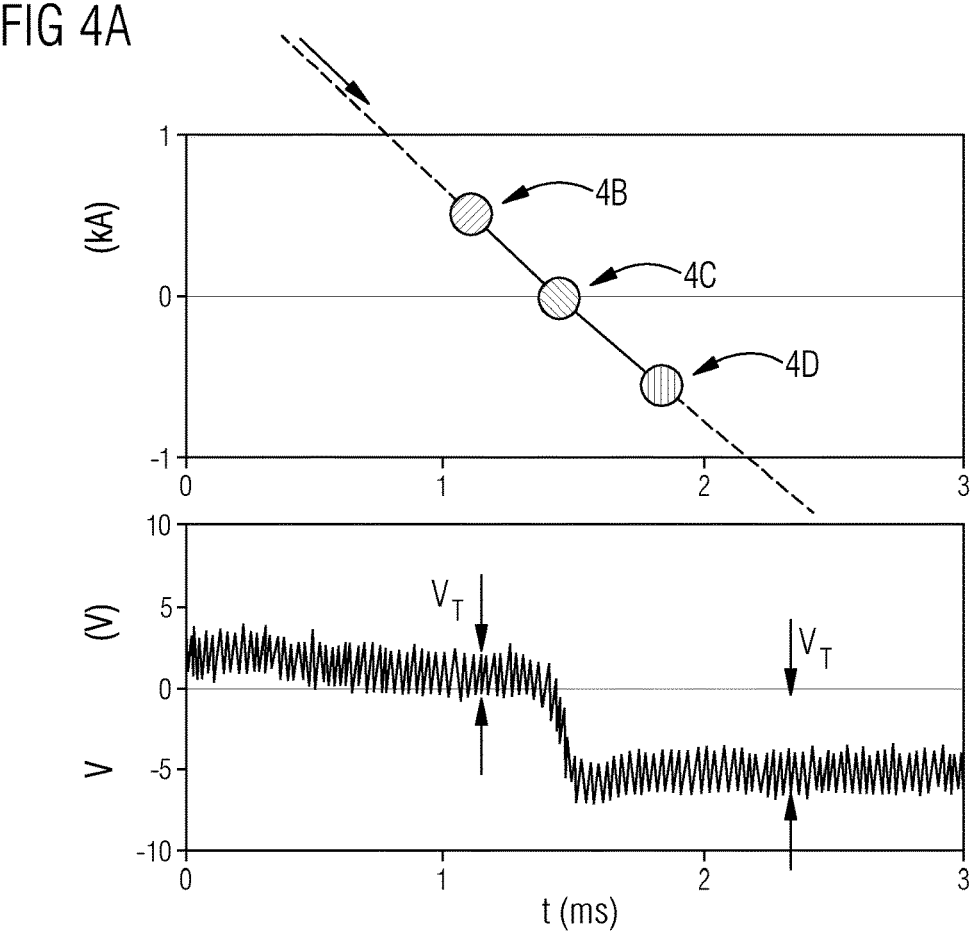
FIG. 4A shows measurements of current and voltage as a function of time for an exemplary embodiment of a switchable bypass device.
Figure 4B:
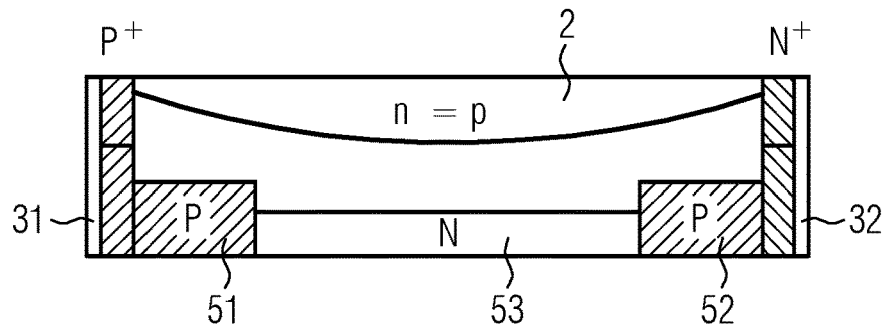
Figure 4C:
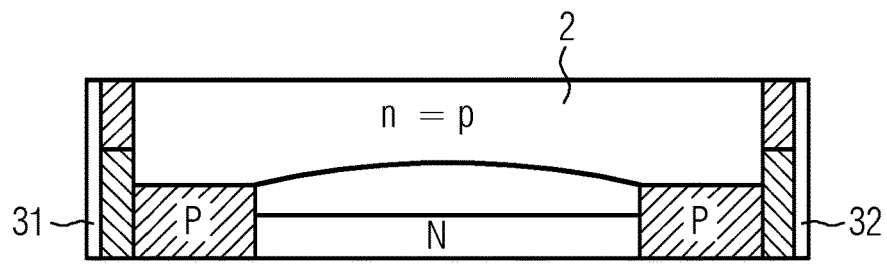
Figure 4D:
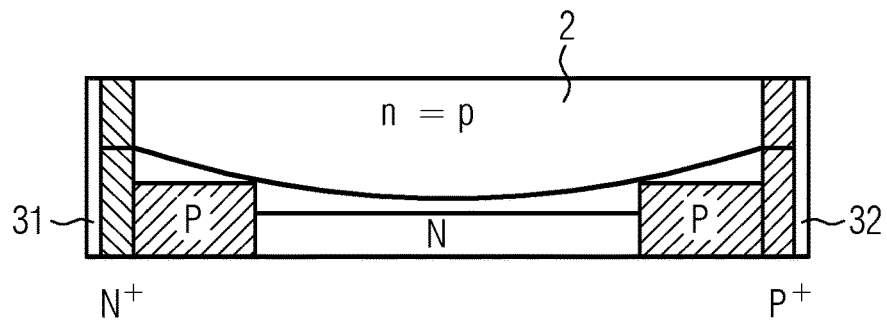
Figure 5A:
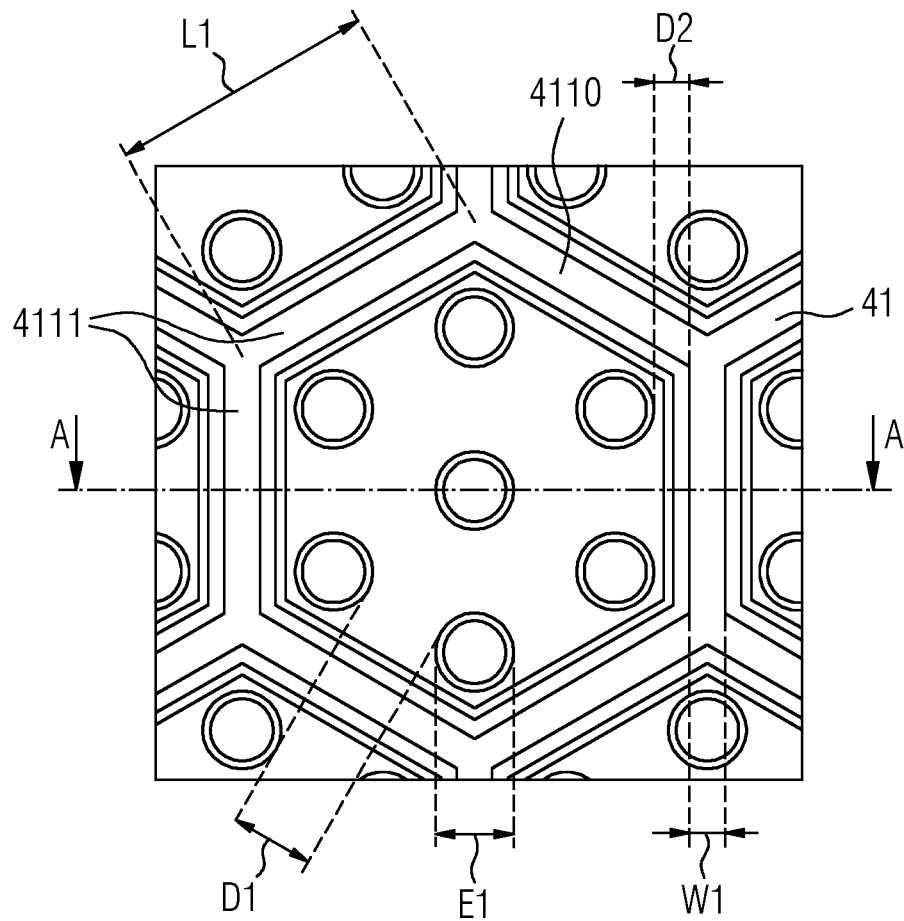
Figure 5B:
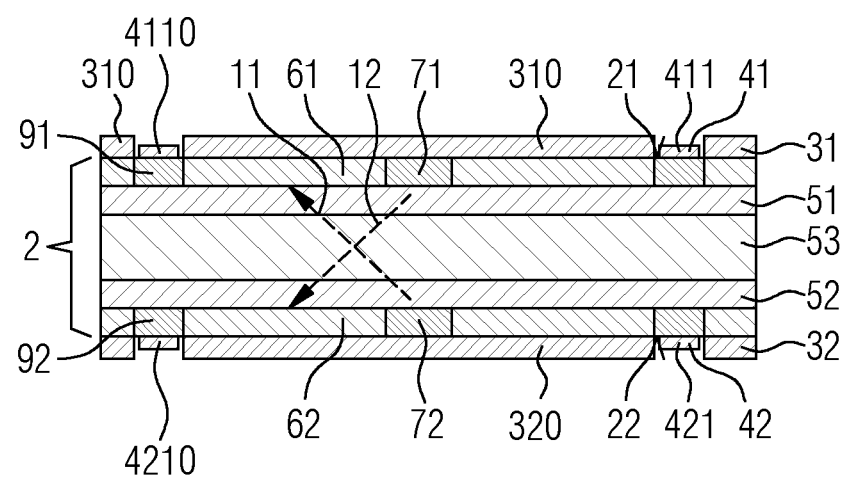
Figure 6:
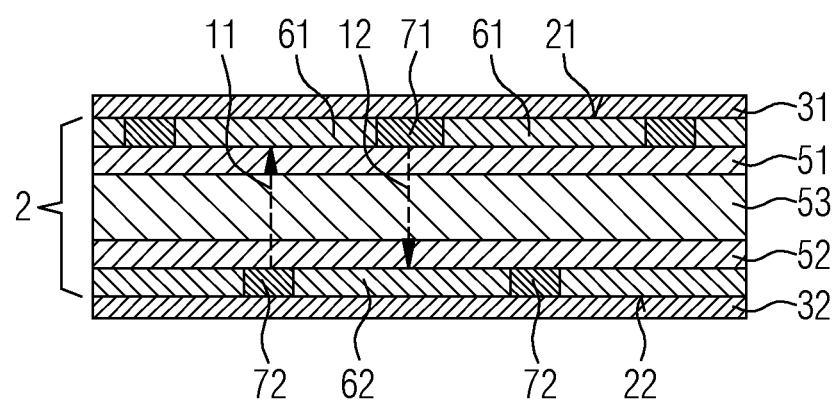

FIGS. 4B, 4C, and 4D show schematic illustrations of the charge carrier distribution within the switchable bypass device at three different stages of FIG. 4A;

FIG. 5A shows a detail of an exemplary embodiment of a switchable bypass device in top view;

FIG. 5B shows a cross-sectional view of the switchable bypass device of FIG. 5A;

FIG. 6 shows a detail of a further exemplary embodiment of a switchable bypass device in cross-sectional view.

The elements illustrated in the figures and their size relationships among one another are not necessarily true to scale. Rather, individual elements or layer thicknesses may be represented with an exaggerated size for the sake of better representability and/or for the sake of better understanding.

Figure 1:
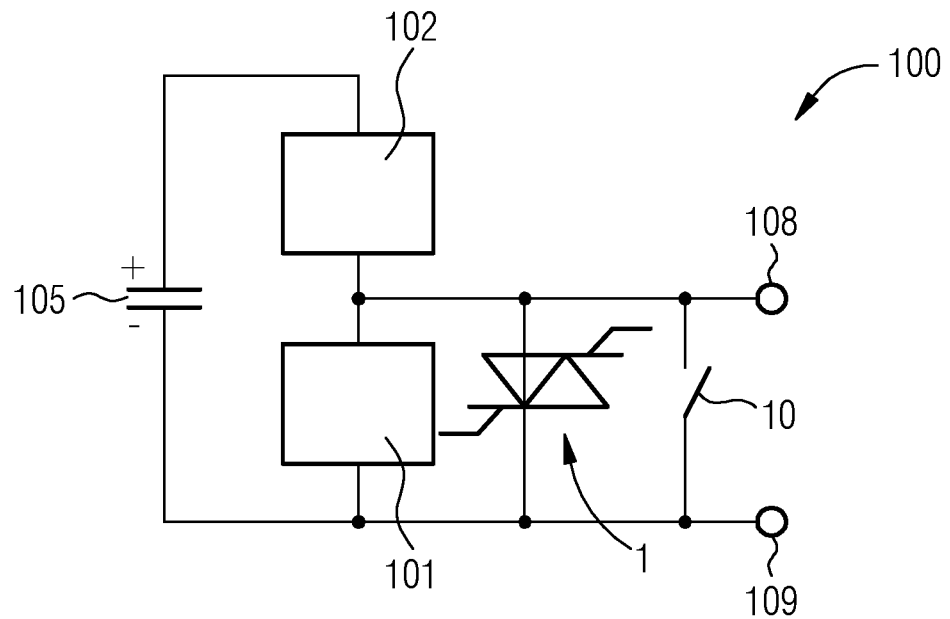
FIG. 1 shows an exemplary embodiment of a module.

An exemplary embodiment of a module 100 is illustrated in FIG. 1.

The module 100 is configured as a half bridge cell of an MMC for instance. The module 100 comprises an energy store 105, a first switch 101 and a second switch 102. The module 100 further comprises a first module connection 108 and a second module connection 109.

At least one of the first and second switches may comprise an IGBT (insulated gate bipolar transistor) for instance.

The module 100 further comprises a switchable bypass device 1 arranged between the first module connection 108 and the second module connection 109. During regular operation of the module 100 the switchable bypass device 1 is in a non-conducting OFF state so that there is no current flow through the switchable bypass device 1. The voltage between the first module connection 108 and the second module connection 109 depends on the state of the first switch 101 and the second switch 102. If the first switch 101 is open and the second switch 102 is closed, the voltage difference between the first module connection 108 and the second module connection 109 corresponds to the voltage of the energy store 105. If the first switch 101 is closed and the second switch 102 is open there is no, or at least no significant, voltage difference between the first module connection 108 and the second module connection 109.

In the case of a fault the switchable bypass device 1 may be switched into the ON state so that there is an electrical bypass between the first module connection 108 and the second module connection 109 circumventing the energy store 105 and the first and second switches 101, 102.

For example, the switchable bypass device 1 includes a first thyristor functional element 11 and a second thyristor functional element 12 arranged in anti-parallel and integrated into a common semiconductor body. Exemplary embodiments of the switchable bypass device 1 are described in more detail in connection with FIGS. 3 through 6.

The module 100 may further comprise a further bypass 10 which may be, for example, a mechanical switch. A mechanical switch can be used to release the switchable bypass device 1 from too heavy loading, for instance during a too long fault event. For example, the switchable bypass device 1 and the further bypass device 10 may be triggered simultaneously. A mechanical switch can be also used for protection under the condition of zero supply voltage of the MMC system.

Due to the high reliability of the switchable bypass device 1, the mechanical switch may be dispensed with, for example if the case of zero voltage at the MMC is avoided by other means. For example, the switchable bypass device may be configured such that it irreversibly switches into a permanent short circuit state in the event of a predetermined amount of overload. For example, a conduction path within the switchable bypass device is formed by melting if the predefined amount of overload is reached.

A single trigger pulse is sufficient for the switchable bypass device 1 to stay permanently in the ON state until the switchable bypass device 1 is shorted by the further bypass device 10 or until the fault is cleared. This is described in more detail in connection with FIGS. 4A to 4C.

The triggering may be performed via an electrical signal. However, an optical triggering may also be used. In the case of electrical triggering via a gate electrode of the switchable bypass device, the turn-on order in the event of a fault may be given such that the gate electrode, for which the polarity of the voltage between anode and cathode corresponds to that of the forward blocking of the corresponding thyristor function of the switchable bypass device, will be provided with the triggering pulse.

The triggering may also be performed via an electrical or optical signal brought into the two gates at the same time. The control system controlling the module then does not need not to take into account the polarity of the anode to cathode voltage. For all the triggering options, only a single gate trigger pulse is needed to activate the protection. This represents substantial simplification compared to prior art.

A further example for a critical internal fault is a valve AC terminal earth fault within the MMC so that some of the cells may experience an abnormally high voltage due to excessive charge. In this case a turn-on order may be sent to the switchable bypass device 1 which will prevent further charging of the cell. Thus, an over-voltage on the cell will be prevented. Due to the internal fault of the MMC the whole MMC will be shut down so that the current through the switchable bypass device 1 will be zero in the end. This will switch the switchable bypass device 1 into the OFF (or open) state so that the module will function as normal when the module is energized for the next time.

Figure 2:
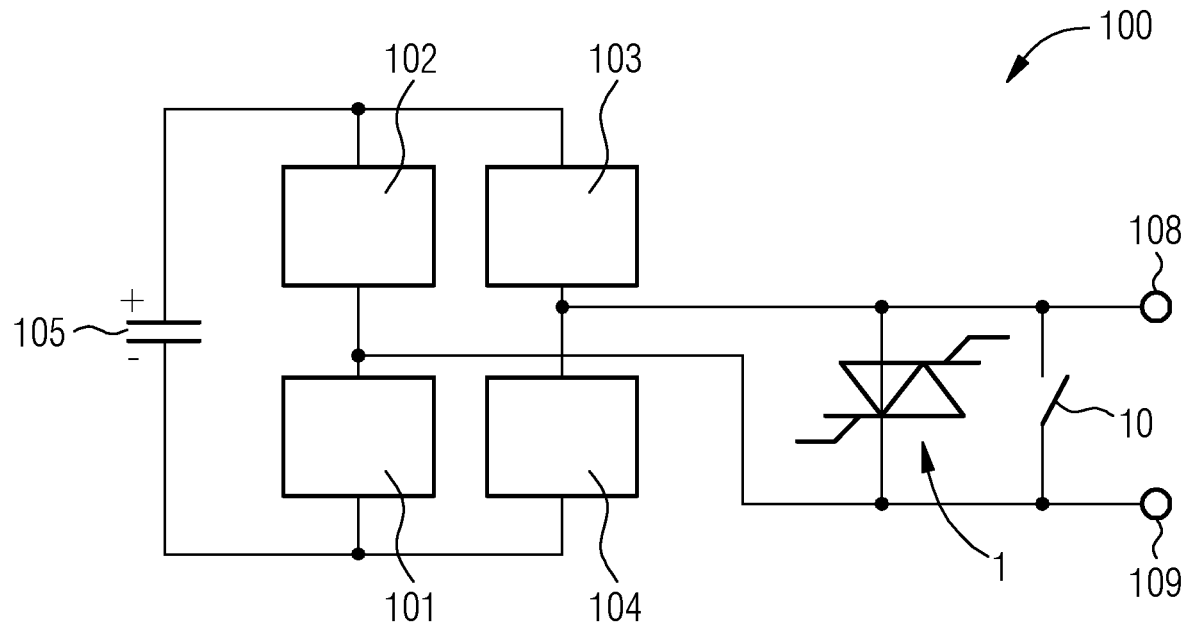
FIG. 2 shows a further exemplary embodiment of a module.

The exemplary embodiment shown in FIG. 2 essentially corresponds to that described in connection with FIG. 1. In departure therefrom the module 100 is configured as a full-bridge arrangement with two additional switches, namely a third switch 103 and a fourth switch 104. Using a full-bridge arrangement three different voltage levels between the first module connection 108 and the second module connection 109 may be obtained. Compared to the half-bridge arrangement, this is, however, at the expense of additional switches.

If the first switch 101 and the third switch 103 are closed, the voltage between the first and second module connection 108, 109 corresponds to the positive voltage of the energy store 105.

If, on the other hand, the second switch 102 and the fourth switch 104 are closed, the voltage corresponds to the negative voltage of the energy store 105. If the second switch 102 and the third switch 103 or the first switch 101 and the fourth switch 104 are closed, the voltage at the first and second module connection is zero.

The switchable bypass device 1 is also suited for other modules that require a bypass protection.

Figure 3:
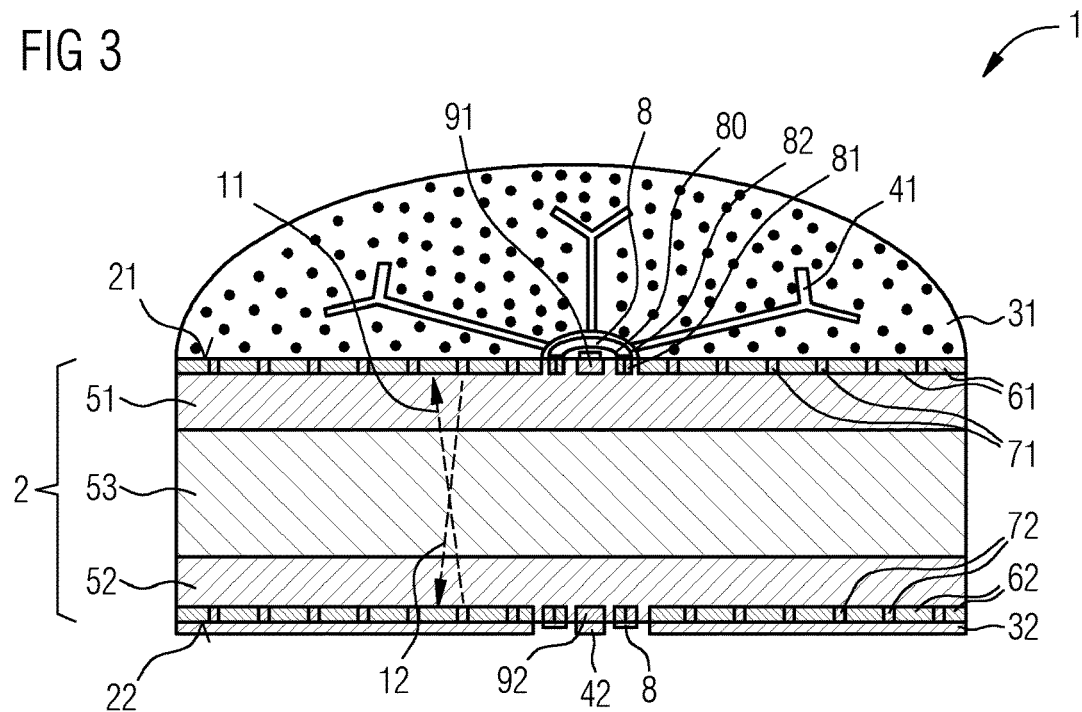
FIG. 3 shows an exemplary embodiment of a switchable bypass device.

FIG. 3 illustrates an exemplary embodiment of a switchable bypass device 1 in a schematic cutaway view. The switchable bypass device 1 comprises a semiconductor body 2 extending between a first main surface 21 and a second main surface 22.

The semiconductor body comprises a first base layer 51 of a first conductivity type, a second base layer 52 of the first conductivity type and a third base layer 53 of a second conductivity type different than the first conductivity type arranged between the first base layer 51 and the second base layer 52 in vertical direction. A first main electrode 31 is arranged on the first main surface 21 and a second main electrode 32 is arranged on the second main surface 22. For instance, the first conductivity type is p-type and the second conductivity type is n-type or vice versa.

The first main electrode 31 acts as a cathode for a first thyristor functional element 11 and as an anode for a second thyristor functional element 12. For the second thyristor functional element 12 the first main electrode 31 acts as an anode via the first emitter short region 71. The first thyristor functional element 11 and the second thyristor functional element 12 are illustrated in FIG. 3 using arrows. These functional elements represent two antiparallel connected thyristor structures arranged within the same semiconductor body 2.

The first main electrode 31 adjoins at least one first emitter region 61 of the second conductivity type and a plurality of first emitter short regions 71 of the first conductivity type.

The second main electrode adjoins at least one second emitter region 62 of the second conductivity type and at a plurality of second emitter short region 72 of the first conductivity type. The first thyristor functional element 11 is formed in this embodiment by the second emitter short region 72 acting as an anode, the second base layer 52, the third base layer 53, the first base layer 51 and the first emitter region 61.

Accordingly, the second thyristor functional element 12 is formed by the first emitter short region 71 acting as an anode, the first base layer 51, the third base layer 53, the second base layer 52 and the second emitter region 62. Consequently, the emitter short regions 71, 72 also fulfil the function of an anode for the associated antiparallel thyristor functional element.

Between the first base layer 51 and the third base layer 53 as well as between the third base layer 53 and the second base layer 52 p-n junctions extending over the entire area of the semiconductor body 2 are formed. Both the first thyristor functional element 11 and the second thyristor functional element 12 may thus use the entire area of these p-n junctions. A high surge current capability close to that of a single thyristor of the same size may be obtained in this manner.

The semiconductor body 2 comprises silicon, for example. However, other semiconductor materials may also be used, for instance SiC (silicon carbide).

The switchable bypass device 1 further comprises a first gate electrode 41 on the first main surface 21 and a second gate electrode 42 on the second main surface 22. A switchable bypass device 1 having two gate electrodes may be turned on with respect to both current directions.

However, one of the first and second gate electrodes 41, 42 may also be dispensed with.

The first gate electrode 41 forms an ohmic contact with the first base layer 51 via a first gate contact region 91 of the semiconductor body 2 adjoining the first main surface 21. The second gate electrode 42 forms an ohmic contact with the second base layer 52 via a second gate contact region 92 of the semiconductor body 2 adjoining the second main surface 22. The first gate contact region 91 and the second gate contact region 92 are of the same conductivity type as the first base layer 51.

In the exemplary embodiment shown an amplifying gate structure 8 is integrated into the first gate electrode 41 and the second gate electrode 42. The amplifying gate structure 8 comprises a section 80 of the first gate electrode 41. For example, the section 80 is formed as a ring extending around a first gate electrode pad. The first gate electrode pad is configured as an external contact for the application of an external trigger current to the first gate electrode 41. The section 80 overlaps with a first partial region 81 of the first conductivity type and a second partial region 82 of the second conductivity type. This results in an amplification of current pulses applied to the first gate electrode 41 via the first gate electrode pad. In principle, this is a Darlington configuration of two bipolar transistors integrated within a thyristor body.

The semiconductor body 2 is configured with respect to a charge carrier recombination lifetime such that the switchable bypass device 1 does not turn off in response to a voltage commutation. This is described in connection with FIGS. 4A through 4D.

FIG. 4A shows exemplarily the measured voltage V and the current I as a function of time around the zero voltage (or current) crossing point during an approximately linear decrease of the current I. FIGS. 4B to 4D illustrate the charge carrier distributions between the first main electrode 31 and the second main electrode 32 for three different stages, labeled as 4B, 4C and 4D in FIG. 4A.

In the stage 4B the first main electrode 31 acts as an anode and the second main electrode 32 acts as a cathode. A large number of electrons and holes is available in the semiconductor body 2 as schematically illustrated in FIG. 4B.

At the zero voltage crossing point, labelled as 4C in FIG. 4A, the number of available charge carriers decreases but the lifetime of the charge carriers is so long that the formation of a space charge region is prevented (FIG. 4C). As the switchable bypass device 1 is not fully depleted from the free charge carriers, it can go back to the ON state just with changed polarity of the current (stage 4D illustrated in FIG. 4D). In stage 4D the first main electrode 31 acts as cathode and the second main electrode 32 as anode for the antiparallel thyristor functional element.

This means that the switchable bypass device 1 represents an AC switch which remains in the ON state if the polarity of the voltage between the first and second main electrodes 31, 32 changes. For example, the frequency is at least 50 Hz. Therefore a single trigger pulse via one gate electrode is sufficient to switch the switchable bypass device 1 into the ON state for both polarities. Thus, one of the first and second gate electrodes may be omitted.

If the switchable bypass device comprised two individual separate thyristor elements instead, the thyristor elements would have to be triggered each time the polarity of the voltage changes. This is a problem especially for the large-area thyristors with relatively slow turn-on due to the limited speed of lateral plasma (conducting area) spreading during the turn-on process.

At least one of the first gate electrode 41 and the second gate electrode 42 may comprise several branches in order to improve the distribution of the gate pulses over the area of the switchable bypass device 1. For example, a structure resembling a snowflake may be formed by the branches. The first and second main electrodes 31, 32 are configured in each case as contiguous elements.

The semiconductor body 2 may be a full wafer. However, the semiconductor body 2 may also be a part of a wafer, so that the switchable bypass device 1 is a chip obtained by singulation of a processed wafer into individual devices. In this case, the switchable bypass device may comprise a planar pn junction termination, for example using guard rings or a variation lateral doping (VLD). At the same time deep p-type sinks may be provided for reverse blocking capability.

The exemplary embodiment of a switchable bypass device shown in FIGS. 5A and 5B essentially corresponds to that described in connection with FIG. 3.

In departure therefrom, the first main electrode 31 comprises a plurality of first segments 310 that are spaced apart from one another. At least some of the first segments 310, for instance at least 50%, or at least 90% or all of the first segments are completely surrounded by the first gate electrode 41 in a view onto the first main surface 21.

The first gate electrode 41 comprises a first grid structure 411 connected to a first gate electrode pad (not shown in the Figure).

Each of the first segments 310 of the first main electrode 31 adjoin at least one first emitter region 61 of the second conductivity type and at least one first emitter short region 71 of the first conductivity type.

In the exemplary embodiments shown in FIG. 5A the first grid structure 411 comprises a plurality of first cells 4110 of hexagonal shape thereby forming a honeycomb structure. However, other polygonal first cells may also apply for the first grid structure 411, for example tetragons or octagons.

As illustrated in the cross-sectional view of FIG. 5B, a second main electrode 32 and a second gate electrode 42 are arranged on a second main surface 22 of the semiconductor body. Like the first main electrode 31, the second main electrode 32 is split into a plurality of second segments 320. At least some of the second segments 320, for instance at least 50%, or at least 90% or all of the second segments 320 are completely surrounded by the second gate electrode 42 in a view onto the second main surface 22.

Each of the second segments 320 of the second main electrode 32 adjoins at least one second emitter region 62 of the second conductivity type and at least one second emitter short region 72 of the first conductivity type.

During operation of the switchable bypass device 1 the first segments 310 of the first main electrode 31 may be electrically contacted to the same electrical potential, for instance by pressing a conductive plate or conductive wafer against the first main electrode 31. As shown in FIG. 5B, the thickness of the first gate electrode 41 within the first grid structure 411 is smaller than that of the first main electrode 31. Thus, the first grid structure 411 does not form an electrical contact to the plate or wafer. This applies to the second main electrode 32 as well.

The number of cells may vary in wide limits depending on the intended application of the switchable bypass device, for instance between 10 and 5000. For example, a device with a diameter of 100 mm may comprise several hundred first cells formed by the first grid structure 411.

A view onto the first main surface 21 may correspond to a view onto the second main surface 22. Therefore, views onto the second main surface 22 are not explicitly shown in the Figures. Features and parameters described in connection with the configuration on the first main surface 21, for example in connection with the first main electrode 31, the first gate electrode 41, the first grid structure 411, the first cells 4110, the first emitter region 61 and the first emitter short region 71 may likewise also apply for the corresponding element on the second main surface 22, for example for the second main electrode 32, the second gate electrode 42, the second grid structure 421, the second cells 4210, the second emitter region 62, and the second emitter short region 72, respectively.

A length L1 of one side 4111 of the first cells 4110 is between 500 µm and 5000 µm or between 900 µm and 3000 µm inclusive, for instance. The larger the length L1, the larger the contiguous area of the first segments 310 of the first main electrode 31.

A width W1 of one side of at least one of the first cells 4110 is between 100 µm and 2000 µm inclusive, for instance between 100 µm and 500 µm. The width of the sides together with their thickness define the cross-section of the first grid structure 411. The thickness of the first grid structure 411 is between 3 µm and 30 µm inclusive or between 5 µm and 12 µm inclusive, for instance. For instance, using these parameters the cross-section of the first grid structure 411 is big enough to avoid a significant voltage drop along the gate path from the first gate electrode pad to the outermost areas of the first grid structure 411.

The terms "length" and "width" refer to extensions in lateral direction. Thicknesses refer to the extent in vertical direction, i.e. perpendicular to the first main surface.

A maximum lateral extent E1 of the first emitter short regions 71 is between 50 µm and 1000 µm or between 100 µm and 500 µm inclusive, for instance.

An edge-to-edge distance D1 between two emitter short regions 71 within the same first cell is between 200 µm and 1000 µm inclusive or between 300 µm and 500 µm inclusive, for instance. The distance between the emitter short regions may be chosen appropriately to provide sufficiently high dV/dt.

An edge-to-edge distance D2 between the first grid structure 411 and the first emitter short region arranged closest to the first grid structure is between 50 µm and 400 µm or between 100 µm and 200 µm inclusive, for instance.

The above parameters may take into account design rules that do not apply for existing device concepts. For instance this is because the emitter short regions on the cathode side of one thyristor functional element act as anode regions for the antiparallel thyristor functional element at the same time.

Differing from FIG. 5A, for instance, first emitter short regions 71 arranged within one first cell may also have different values for the maximum lateral extent. For example the emitter short regions arranged closer to the edge of the first segments may be smaller than the maximum lateral extent of a first emitter short region arranged closer to the center of the respective first segment.

Alternatively or in addition, the first emitter short region 71 in the center may be replaced by several smaller first emitter short regions 71.

For example, first emitter short regions 71 arranged close to the edge of the first cell may have a diameter between 100 µm and 250 µm inclusive wherein first emitter short region 71 arranged closer to the center of the cell may have a diameter between 150 µm and 500 µm inclusive.

In the example shown in FIG. 5B, each first segment 310 overlaps with a plurality of first emitter short regions 71 wherein one first emitter short region 71 is arranged in the center of the first segment 310, whereas the further first emitter short regions 71 are arranged along the circumference of the first segments 310. However, a single emitter short region 71 may also be sufficient.

The described device structure provides a high di/dt capability due to the massively increased interface area between the gate electrodes and the main electrodes on the first and second main surfaces. Compared to conventional devices, short turn-on times after application of a gate current pulse may be obtained.

In conventional devices, the distance of a short region from a main electrode edge is kept low since it is inversely proportional to the dV/dt capability. This reduces the di/dt capability. In contrast, high values for dV/dt and di/dt may be obtained at the same time for the described bypass device, for example due to the massively increased gate-cathode area.

The exemplary embodiment of FIG. 6 essentially corresponds to that described in connection with FIG. 3.

In departure therefrom, the arrangement of first emitter regions 61 and first emitter short regions 71 on the first main surface 21 differs from the arrangement of second emitter region 62 and second emitter short regions 72 on the second main surface.

When seen onto the first main surface, at least some or all of the first emitter regions 61 overlap with one or more of the second emitter short regions 72. Using this arrangement, a length of a direct current path of the first thyristor functional element 11 and the second thyristor functional element 12 between the first main electrode 31 and the second main electrode 32 may be reduced compared to an arrangement where the first emitter regions 61 have the same size and position as the second emitter regions 62. Thus, the switchable bypass device may behave as if it had a thinner device body resulting in a lower ON state voltage drop and lower electrical losses.

Furthermore, an asymmetric arrangement of the emitter regions 61, 62 and emitter short regions 71, 72 on the different main surfaces 21, 22 may be used in order to intentionally obtain different properties for different polarities.

For example, different protection limits may be obtained for the different polarities. For example, different maximal surge current magnitudes may be obtained For example, one of them can fail at low surge current whereas the second one fails at high surge current. Thus, two different antiparallel functional elements may be incorporated into a single device. This may help to reduce the costs and/or to obtain a smaller footprint.

The described asymmetric configuration of the switchable bypass device 1 may also be used for the exemplary embodiment of FIGS. 5A and 5B.

As in the exemplary embodiments of FIG. 3 and FIGS. 5A and 5B, the switchable bypass device 1 may comprise only one gate electrode or two gate electrodes.

This patent application claims the priority of European patent application EP 20209823.2, the disclosure content of which is hereby incorporated by reference.

The invention described herein is not restricted by the description given with reference to the exemplary embodiments. Rather, the invention encompasses any novel feature and any combination of features, including in particular any combination of features in the claims, even if this feature or this combination is not itself explicitly indicated in the claims or exemplary embodiments.

LIST OF REFERENCE SIGNS 1 switchable bypass device
10 further bypass device
100 module
101 first switch
102 second switch
103 third switch
104 forth switch
105 energy store
108 first module connection
109 second module connection
11 first thyristor functional element
12 second thyristor functional element
2 semiconductor body
21 first main surface
22 second main surface
31 first main electrode
310 first segments
32 second main electrode
320 second segments
41 first gate electrode
411 first grid structure
4110 first cells
4111 side
42 second gate electrode
421 second grid structure
4210 second cells
51 first base layer
52 second base layer
53 third base layer
61 first emitter region
62 second emitter region
71 first emitter short region
72 second emitter short region
8 amplifying gate structure
80 section
81 first partial region
82 second partial region
91 first gate contact region
92 second gate contact region
L1 length of side
W1 width of side
E1 maximum lateral extent of first emitter short region
D1 edge-to-edge distance
D2 edge-to-edge distance

The invention claimed is:

1. A module comprising
a first module connection and a second module connection,
an energy store, and
a first electrical switch and a second electrical switch,
wherein a switchable bypass device is arranged between the first module connection
and the second module connection,
wherein
the switchable bypass device is configured to remain in a bidirectional current conducting state in response to a single trigger pulse,
the switchable bypass device in the bidirectional current conducting state forms an electrical bypass between the first module connection and the second module connection bypassing the energy store, the first electrical switch and the second electrical switch,
the switchable bypass device comprises a semiconductor body extending between a first main surface and a second main surface,
wherein the switchable bypass device comprises a first main electrode arranged on the first main surface, and a second main electrode arranged on the second main surface,
the semiconductor body comprises a first base layer of a first conductivity type, a second base layer of the first conductivity type, and a third base layer of a second conductivity type different than the first conductivity type arranged between the first base layer and the second base layer,
the first main electrode acts as a cathode for a first thyristor functional element and as an anode for a second thyristor functional element of the switchable bypass device,
the semiconductor body is configured with respect to a charge carrier recombination lifetime such that the switchable bypass device does not turn off in response to a voltage commutation, and
a turn-off of the switchable bypass device occurs if the switchable bypass device is brought below its holding current.

2. The module according to claim 1,
wherein
the first main electrode adjoins at least one first emitter region of the second conductivity type and at least one first emitter short region of the first conductivity type, and
the first main electrode acts as the cathode for the first thyristor functional element via the first emitter region and as the anode for the second thyristor functional element via the first emitter short region.

3. The module according to claim 1,
wherein each of the first thyristor functional element and the second thyristor functional element uses an entire area of a p-n junction formed between the first base layer and the third base layer.

4. The module according to of claim 2,
wherein the second main electrode adjoins at least one second emitter region of the second conductivity type and at least one second emitter short region of the first conductivity type.

5. The module according to claim 4,
wherein at least one first emitter region overlaps with a second emitter short region when seen onto the first main surface.

6. The module according to claim 4,
wherein an arrangement of first emitter regions and first emitter short regions on the first main surface differs from an arrangement of second emitter regions and second emitter short regions on the second main surface.

7. The module according to claim 1,
wherein the switchable bypass device comprises a first gate electrode on the first main surface, and wherein the first main electrode comprises a plurality of first segments that are spaced apart from one another, wherein at least some of the first segments are completely surrounded by the first gate electrode in a view onto the first main surface.

8. The module according to claim 7,
wherein the switchable bypass device comprises a second gate electrode on the second main surface and the second main electrode comprises a plurality of second segments that are spaced apart from one another, wherein at least some of the second segments are completely surrounded by the second gate electrode in a view onto the second main surface.

9. The module according to claim 1,
wherein the module is configured as a half-bridge arrangement or as a full-bridge arrangement.

10. The module according to claim 1,
wherein the module is configured for a modular multi-level converter.

11. The module according to claim 1,
wherein the module comprises a further switchable bypass device connected in parallel to the switchable bypass device.

12. The module according to claim 1,
wherein the module is configured to be triggered electrically or optically.

13. The module according to claim 1,
wherein the switchable bypass device is configured to be triggered in the event of a fault within the module or of an external fault causing a voltage applied to the module that exceeds a predetermined value.

* * * * *